US010664740B2

(12) United States Patent
Elizondo, II (10) Patent No.: US 10,664,740 B2
(45) Date of Patent: *May 26, 2020

(54) ANTENNA ELEMENT USING CRIMP TO INCREASE SURFACE AREA

(71) Applicant: MEPS Real-Time, Inc., Carlsbad, CA (US)

(72) Inventor: Paul M. Elizondo, II, Escondido, CA (US)

(73) Assignee: MEPS Real-Time, Inc., Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/160,907

(22) Filed: Oct. 15, 2018

(65) Prior Publication Data
US 2019/0114525 A1   Apr. 18, 2019

Related U.S. Application Data

(63) Continuation of application No. 15/451,310, filed on Mar. 6, 2017, now Pat. No. 10,102,472, which is a continuation of application No. 14/142,610, filed on Dec. 27, 2013, now Pat. No. 9,589,226.

(60) Provisional application No. 61/747,197, filed on Dec. 28, 2012.

(51) Int. Cl.
*G06K 19/077*  (2006.01)

(52) U.S. Cl.
CPC .....   *G06K 19/07786* (2013.01); *A61J 2205/60* (2013.01)

(58) Field of Classification Search
None
See application file for complete search history.

(56) References Cited

U.S. PATENT DOCUMENTS

| 8,212,677 | B2 | 7/2012 | Ferguson | |
|---|---|---|---|---|
| 2001/0054755 | A1* | 12/2001 | Kirkham | B65D 25/205 257/678 |
| 2002/0188259 | A1* | 12/2002 | Hickle | A61M 16/183 604/189 |
| 2005/0189313 | A1 | 9/2005 | Walters, Jr. | |
| 2005/0242657 | A1* | 11/2005 | Hogan | B60B 7/0013 301/37.101 |
| 2005/0242957 | A1 | 11/2005 | Lindsay et al. | |

(Continued)

OTHER PUBLICATIONS

International Search Report by KIPO on related PCT International Application PCT/US2013/078131, dated Apr. 23, 2014, two pages.

*Primary Examiner* — Thomas S McCormack
(74) *Attorney, Agent, or Firm* — Thomas A. Runk; Brooks Kushman P.C.

(57) ABSTRACT

A wireless identification system and method used for identifying medical vials having a metallic crimp includes an RFID tag having a first antenna element located at the crimp so as to be capacitively coupled to the crimp to increase the effective surface area of the RFID antenna, and a second antenna element mounted to the side of the vial between the ends of the labeling mounted on the vial so as to not mask any visually readable information of the labeling. Dielectric adhesive is used in one embodiment to couple the antenna element to the crimp. The invention is particularly useful for small vials. A manufacturing method in which the wireless tag is an integral part of the container is disclosed.

23 Claims, 7 Drawing Sheets

(56) References Cited

U.S. PATENT DOCUMENTS

| | | |
|---|---|---|
| 2007/0001839 A1 | 1/2007 | Cambre et al. |
| 2007/0139205 A1 | 6/2007 | Tanaka et al. |
| 2008/0180216 A1 | 7/2008 | Choi et al. |
| 2008/0252462 A1 | 10/2008 | Sakama |
| 2009/0173007 A1* | 7/2009 | Fogg ................ G06K 19/07749 49/70 |
| 2011/0254665 A1 | 10/2011 | Lindsay et al. |

* cited by examiner

ANTENNA ELEMENT USING CRIMP TO INCREASE SURFACE AREA

CROSS-REFERENCE TO RELATED APPLICATIONS

This application is a continuation of U.S. application Ser. No. 15/451,310 filed Mar. 6, 2017, now U.S. Pat. No. 10,102,472, which is a continuation of U.S. application Ser. No. 14/142,610 filed Dec. 27, 2013, now U.S. Pat. No. 9,589,226, and claims the benefit of U.S. Provisional Application No. 61/747,197, filed Dec. 28, 2012, all of which are incorporated herein by reference.

BACKGROUND

The invention relates generally to applying radio frequency identification (RFID) tags to items, and in particular, to applying RFID tags to medication containers so that the RFID tag is not obtrusive, does not obscure the text labeling of the container, and functions with the closure.

There are a number of ways of identifying and tracking articles including visually, optically (bar coding, for example), magnetically, RFID, weighing, and others. Where an automatic system for tracking is desired, RFID is a candidate since identification data may be obtained wirelessly. RFID tags have decreased in cost, which has made them even more attractive for such an application.

Radio-frequency identification ("RFID") is the use of electromagnetic energy ("EM energy") to stimulate a responsive device (known as an RFID "tag" or transponder) to identify itself and in some cases, provide additionally stored data. RFID tags typically include a semiconductor device commonly called the "chip" on which are formed a memory and operating circuitry, which is connected to an antenna. Typically, RFID tags act as transponders, providing information stored in the chip memory in response to a radio frequency ("RF") interrogation signal received from a reader, also referred to as an interrogator. In the case of passive RFID devices, the energy of the interrogation signal also provides the necessary energy to operate the RFID device.

RFID tags may be incorporated into or attached to articles to be tracked. In some cases, the tag may be attached to the outside of an article with adhesive, tape, or other means and in other cases, the tag may be inserted within the article, such as being included in the packaging, located within the container of the article, or sewn into a garment. The RFID tags are manufactured with a unique identification number which is typically a simple serial number of a few bytes with a check digit attached. This identification number is incorporated into the tag during manufacture. The user cannot alter this serial/identification number and manufacturers guarantee that each serial number is used only once. This configuration represents the low cost end of the technology in that the RFID tag is read-only and it responds to an interrogation signal only with its identification number. Typically, the tag continuously responds with its identification number. Data transmission to the tag is not possible. These tags are very low cost and are produced in enormous quantities.

Such read-only RFID tags typically are permanently attached to an article to be tracked and, once attached, the serial number of the tag is associated with its host article in a computer data base. For example, a particular type of medicine may be contained in hundreds or thousands of small vials. Upon manufacture, or receipt of the vials at a health care institution, an RFID tag is attached to each vial. Each vial with its permanently attached RFID tag will be checked into the data base of the health care institution upon receipt. The RFID identification number may be associated in the data base with the type of medicine, size of the dose in the vial, and perhaps other information such as the expiration date of the medicine. Thereafter, when the RFID tag of a vial is interrogated and its identification number read, the data base of the health care institution can match that identification number with its stored data about the vial. The contents of the vial can then be determined as well as any other characteristics that have been stored in the data base. This system requires that the institution maintain a comprehensive data base regarding the articles in inventory rather than incorporating such data into an RFID tag.

An object of the tag is to associate it with an article throughout the article's life in a particular facility, such as a manufacturing facility, a transport vehicle, a health care facility, a pharmacy storage area, or other environment, so that the article may be located, identified, and tracked, as it is moved. For example, knowing where certain medical articles reside at all times in a health care facility can greatly facilitate locating needed medical supplies when emergencies arise. Similarly, tracking the articles through the facility can assist in generating more efficient dispensing and inventory control systems as well as improving work flow in a facility. Additionally, expiration dates can be monitored and those articles that are older and about to expire can be moved to the front of the line for immediate dispensing. This results in better inventory control and lowered costs.

RFID tags may be applied to containers or articles to be tracked by the manufacturer, the receiving party, or others. In some cases where a manufacturer applies the tags to the product, the manufacturer will also supply a respective data base file that links the identification number of each of the tags to the contents of each respective article. That manufacturer supplied data base can be distributed to the customer in the form of a file that may easily be imported into the customer's overall data base thereby saving the customer from the expense of creating the data base manually. It has been noted that where the customer must create the data base, a manual method is often used. The customer's employee reads the RFID device identification and once received at the employee's computer, then manually types the data on the container into the computer data base associating it with the RFID device's identification. Such manual entry of data can result in a higher incidence of errors.

Many RFID tags used today are passive in that they do not have a battery or other autonomous power supply and instead, must rely on the interrogating energy provided by an RFID reader to provide power to activate the tag. Passive RFID tags require an electromagnetic field of energy of a certain frequency range and certain minimum intensity in order to achieve activation of the tag and transmission of its stored data. Another choice is an active RFID tag; however, such tags require an accompanying battery to provide power to activate the tag, thus increasing the expense and the size of the tag and making them undesirable for use in a large number of applications.

Depending on the requirements of the RFID tag application, such as the physical size of the articles to be identified, their location, and the ability to reach them easily, tags may need to be read from a short distance or a long distance by an RFID reader. Such distances may vary from a few centimeters to ten or more meters. Additionally, in the U.S. and in other countries, the frequency range within which such tags are permitted to operate is limited. As an example, lower frequency bands, such as 125 KHz and 13.56 MHz, may be used for RFID tags in some applications. At this frequency range, the electromagnetic energy is less affected by liquids and other dielectric materials, but suffers from the limitation of a short interrogating distance. At higher frequency bands where RFID use is permitted, such as 915 MHz and 2.4 GHz, the RFID tags can be interrogated at longer distances, but they de-tune more rapidly as the material to which the tag is attached varies. It has also been found that at these higher frequencies, closely spaced RFID tags will de-tune each other as the spacing between tags is decreased.

The read range (i.e., the range of the interrogation and/or response signals) of RFID tags is limited. For example, some types of passive RFID tags have a maximum range of about twelve meters, which may be attained only in ideal free space conditions with favorable antenna orientation. In a real situation, the observed tag range is often six meters or less. In addition to the above, the detection range of the RFID systems is typically limited by signal strength to short ranges, frequently less than about thirty centimeters for 13.56 MHz systems. Therefore, portable reader units may need to be moved past a group of tagged items in order to detect all the tagged items, particularly where the tagged items are stored in a space significantly greater than the detection range of a stationary or fixed single reader antenna. Alternately, a large reader antenna with sufficient power and range to detect a larger number of tagged items may be used. However, such an antenna may be unwieldy and may increase the range of the radiated power beyond allowable limits. Furthermore, these reader antennae are often located in stores or other locations where space is at a premium and it is expensive and inconvenient to use such large reader antennae. In another possible solution, multiple small antennae may be used but such a configuration may be awkward to set up when space is at a premium and when wiring is preferred or required to be hidden.

In the case of medical supplies and devices, it is desirable to develop accurate tracking, inventory control systems, and dispensing systems so that RFID tagged devices and articles may be located quickly should the need arise, and may be identified for other purposes, such as expiration dates or recalls. Automated dispensing cabinets ("ADC") and similar cabinets used in a health care facility exist where the contents of the drawers of the cabinet need to be tracked; i.e., inventoried periodically. A large number of medical items, devices, and articles are located closely together in the drawers. RFID tracking systems for medications do exist and have been found to be particularly helpful in automating medication inventorying and tracking in medical facilities. One such system is the Intelliguard System from MEPS Real-Time, Inc. of Carlsbad, Calif.

Glass vials ranging in size from 1 ml to 50 ml used in the pharmaceutical industry to store liquid and powder medication can present challenges to RFID tagging due to their small size, metal cap, and FDA required product labeling. Small glass vials are used extensively in the US pharmaceutical industry. These vials can be as small as 0.625 inches (15.875 mm) in diameter and 1.25 inches (31.75 mm) tall. Liquid medication is generally stored in these vials; however, medication in powder form can also be stored in the vials.

These small vials are used to store as little as 1 ml and up to more than 100 ml of liquid medication. The glass vial is capped by a combination of rubber and metal materials. The rubber component serves two purposes:

1. The rubber material presses against the glass of the vial to form a seal that prevents the liquid from escaping the vial; and
2. An exposed area of rubber in the top of the cap provides access to the medication via a sharpened cannula or needle of a syringe for example.

The metal portion, or "crimp," of the cap presses the rubber material against the glass vial to safely secure the cap onto the vial.

Tracking a very small glass medication vial, such as a 1 ml vial, with a UHF RFID tag is a challenge. This is principally due to the fact that most RFID tags operating in the United States in the UHF 915 MHz Industrial, Scientific, and Medical bands ("ISM") are too large in size for attachment to the small vials. The small near-field tags that are typically attached to the bottom of the smallest vial have a very short read distance and can be rendered non-functional when stacked on top of the metal cap of an adjacent vial.

The performance of current RFID tracking tags, placed on or near the medication vial metal cap, is greatly reduced due to detuning of the RFID tag antenna. The best current method for tracking small medication vials, using UHF RFID technology, requires the placement of a small round (0.3 inch or 7.62 mm diameter) "near-field" tag on the bottom of the vial, as mentioned above. (Note—the term "near field" is used to refer to a UHF RFID tag that has been optimized for harvesting the near-field magnetic energy transmitted from a UHF antenna. These "near-field" tags exhibit very short read distances (6 to 12 inches or 15.24 to 30.48 mm) but are less susceptible to detuning from liquids contained in the items being tracked). The "near-field" UHF tags perform best when positioned parallel to a UHF transmit antenna which has also been optimized for "near-field" transmission. This orientation limitation requires that all medication vials be standing straight up, with the tags parallel to the antenna, in order that they be accurately and repeatedly identified. If a medication vial is in a different orientation, chances of accurate detection are lessened. The current RFID tag employed for UHF tracking medication vials can only be easily identified in one orientation (parallel to the transmit antenna). The performance of current RFID tracking tags, placed on or near the medication vial metal cap, is greatly reduced.

Containers containing prescription medications are also subject to FDA required labeling. The FDA regulations (21 CFR § 610.60) for container labels include the need to place certain information on the label. In particular, the following items shall appear on the label affixed to each container of a product capable of bearing a full label:

(1) The proper name of the product;
(2) The name, address, and license number of manufacturer;
(3) The lot number or other lot identification;
(4) The expiration date;
(5) The recommended individual dose for multiple dose containers;
(6) The statement: "Rx only" for prescription biologicals; and
(7) A Medication Guide, if required.

If the container is capable of bearing only a partial label, the container shall show as a minimum the name (expressed either as the proper or common name), the lot number or other lot identification and the name of the manufacturer; in addition, for multiple dose containers, the recommended individual dose. Containers bearing partial labels shall be placed in a package which bears all the items required for a package label.

Such "labels" may consist of a physical base material on which is formed a principal display panel ("PDP"), which is defined by the FDA as "the panel of a label that is most likely to be displayed, presented, shown, or examined by the end user." In most cases there is a border on the label material surrounding the PDP that contains no information. The label may be attached to the medication container through various means, one of which is with adhesive. For the purposes of this application, when referring to a label the inventor intends to mean the PDP. In most cases, the base material does not completely surround the side of the container so that one end of the label meets the other end when it is mounted. Usually, there is space between the ends of the label when it is mounted to the vial or container. But in most cases, there is space between the ends of the PDP when the base material of the label is mounted to the container, as is shown in FIG. 1.

Figure 1:
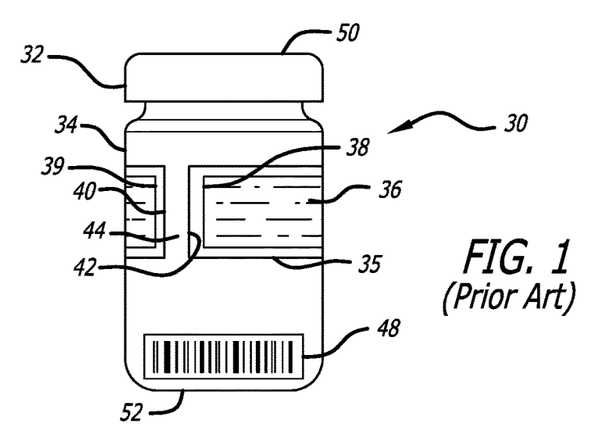
FIG. 1 is a side view of a typical prior art glass medication container or vial having a metallic crimp top and labeling along its side, the label having a size where the ends of the label base material do not meet when the label is mounted to the vial. The label is also shown has having a principal display panel, "PDP, that contains the visually readable material about the contents of the container and in this case, the container also includes an optically-readable bar code;"

Referring now to FIG. 1 with more particularity, a typical label base material 35 is mounted to a medication container or vial 30. The PDP on this label base material is indicated by numeral 36. The ends 40 and 42 of the label base material do not meet when the label is applied to the container and there is space 44 between the ends of the base material. There is therefore also space between the ends 38 and 39 of the PDP since the PDP is part of and is smaller than the base material. In cases where the base material ends meet when the label is applied to a container, the ends of the PDP may still have space between them on the container. As will be discussed below, this space between the ends of the PDP is used to mount an RFID device permanently to the container to enable wireless identification of the container by RF energy. In particular, an RFID system is described.

The label PDP is shown in FIG. 1 having dashed lines on it which are meant to indicate visually readable information. This usually includes text, such as drug identification and concentration, and may also include other information. Information on the PDP may also include graphic or non-text information. In the case of FIG. 1, a bar code 48 is also included near the closed end of the container.

Figure 2:
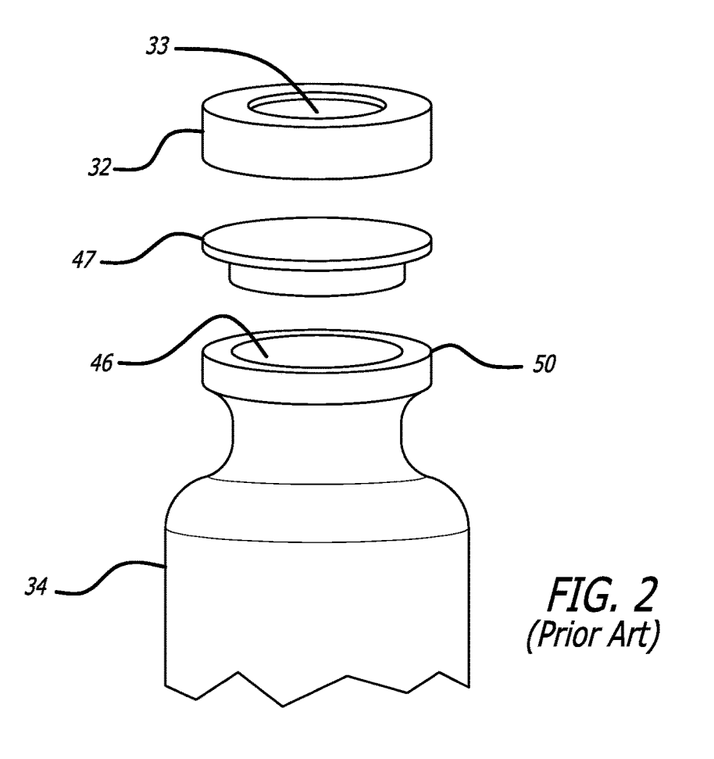
FIG. 2 is an exploded perspective view of a typical arrangement of a sealed medical item container that includes a glass vial, a rubber stopper, and a metallic crimp closure that holds the stopper in place in the opening of the glass vial to seal it.

Turning now to FIG. 2, there is a typical glass container or vial 34 having an opening 46 at the top 50 directly opposite a closed end 52 (shown in FIG. 1), a rubber stopper 47, and a crimp closure 32 having an opening 33 formed therein so that the stopper is accessible to penetration by a cannula for extraction of the item in the container, or for adding to the item in the container. As is well known to those of skill in the art, the crimp closure is used to secure the stopper in place at the opening of the container to seal the container.

Figure 3:
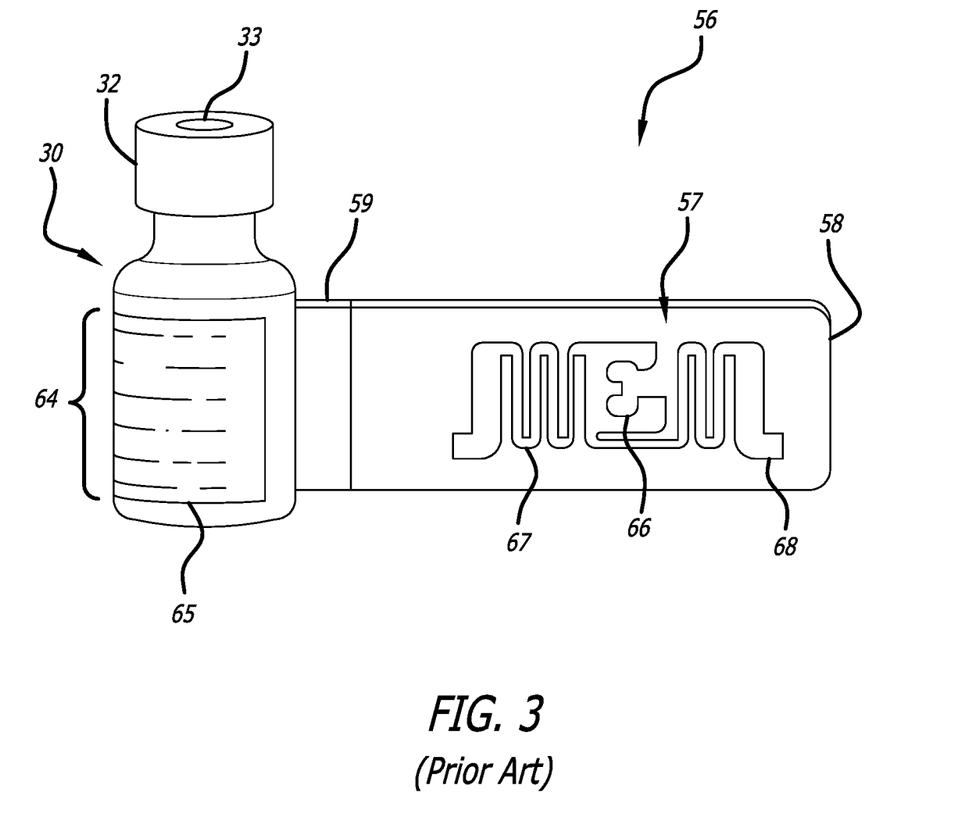
FIG. 3 is a view of a 1 ml container having an information label mounted to its side, a metallic crimp closure that holds a stopper in place to seal the container, and an RFID device located on a strip of material that is attached to the container with clear adhesive tape, the RFID arrangement referred to as a "flag tag;"

Turning now to FIG. 3, a prior art "flag tag" identification system 56 is shown. In this view, the medical item container 30 is small in size and in this case is a 1 ml vial. There is a metallic crimp closure 32 around a rubber stopper (not shown) with the crimp closure having an opening 33 at the top through which a cannula may be used to interact with the medical item within the vial. The "flag tag" 56 is actually an RFID device 57 mounted to a substrate 58 that is flexible. The substrate is then taped 59 to the vial 30. The width of the substrate and tape is approximately equal in this case to the barrel portion 64 of the vial, due to the small size of the vial. In most cases, clear tape is used to attach the RFID device to the vial so that the visual information on the label 65 can be read through the tape. The RFID device 57 includes in this case a circuitry element 66 containing a memory and processor and other components, and first 67 and second 68 antenna elements. The two antenna elements provide two poles for this RFID device. Other antenna arrangements are possible, as is discussed below in more detail.

"Flag tag" RFID systems are used typically because the particular vial size is too small for mounting the RFID device on it. The flag tag is manually taped to the vial over the labeling and the identification number of the RFID tag is read into a data base for the medical item within the vial to which the tag is attached. The flag tagged medical item container can then be put into the medication "stream" within a facility and can be tracked by means of its associated RFID device. However, disadvantages exist. Such flag tags can inadvertently be pulled off the vial because they are fairly large and extend outward from the vial in a flag style. Gripping them by the substrate may cause the flag tag to pull off of the vial. They can be difficult to handle because of the flexibility of the RFID substrate, which may interact with flag tags of other small vials interfering with the orderly stocking of the vials in a drawer or other storage unit. When put into drawers of a storage device, such as an ADC, the flag tag can be torn from the medication vial by catching of the door or frame hardware.

Hence, a need has been recognized in the art for a wireless identification system that is useful for small medical item containers where the identification system is a part of the container and provides accurate detection and identification of the container. A need has also been recognized for an identification system that can be mounted to a medical item container that does not mask visually readable information of the labeling of the container. A further need has been recognized for an identification system that is small in size yet provides an antenna surface area large enough for accurate identification. The invention fulfills these needs and others.

SUMMARY OF THE INVENTION

An RFID tag in accordance with aspects of the invention operates with the metal closures of medication containers to provide improved location identification operation and at the same time, avoid obscuring the text and bar code labeling on the container. The resulting RFID tag can then be more accurately identified in multiple orientations.

Briefly, and in general terms, the invention is directed to a system for identifying a medical container, the container having a size selected to hold a medical item and having an opening at one end, the system comprising a metallic closure located at the opening of the container, a wireless identification tag comprising a first antenna element and a tag circuitry element, the tag circuitry element including a memory and a processor, the tag circuitry element being connected to the antenna element, the tag circuitry element configured to receive an interrogation signal through the antenna element and to transmit a response identification signal to the interrogation signal through the antenna element, wherein the response identification signal is associated with a medical item held by the medical container to identify the held item, wherein the first antenna element is electrically connected to the metallic closure of the container thereby increasing the effective surface area of the antenna with the metallic closure.

In more detailed aspects, the system for identifying a medical container further comprises an electrically resistant seal located between the metallic closure and the item contained by the medical container whereby the seal provides electrical insulation to the medical item held by the medical container from the electrically conductive metal closure. The system for identifying a medical container further comprises a dielectric element located between the first antenna element and the metallic closure with the antenna element contacting the dielectric element on one side of the dielectric element and the metallic closure of the medical container contacting the dielectric element on an opposite side of the dielectric element from the antenna element, whereby the antenna element is capacitively coupled to the metallic container closure. In yet a further detailed aspect, the dielectric element comprises adhesive located on either side of the dielectric element whereby the first antenna element is held by adhesive to one side of the dielectric element and the metallic closure is held by adhesive to an opposite side of the dielectric element from the antenna element, whereby the antenna element is capacitively coupled to the metallic container closure.

In other more detailed aspects, the system for identifying a medical container further comprises a second antenna element also connected to the circuitry element through which an interrogation signal is received and an identification response signal is transmitted, wherein the second antenna element is located along a side of the medical container at a position that does not mask any visually-readable labeling of the container. The medical container also includes a label located around the container, the label having visually readable information concerning the contents of the container and also having two ends separated from each other by a space, wherein the second antenna element is located in the space between the two label ends.

In additional detailed aspects, the first antenna element is directly electrically connected to the metallic closure and the system further comprises an electrically resistant seal located between the metallic closure and the item contained by the medical container whereby the seal provides electrical insulation to the medical item held by the medical container from the electrically conductive metal closure.

In another aspect, the system further comprises a second antenna element also connected to the circuitry element through which an interrogation signal is received and an identification response signal is transmitted, wherein the second antenna element is located along a side of the medical container at a position that does not mask any visually-readable labeling of the container. The medical container includes a label located around the container, the label having visually readable information concerning the contents of the container and also having two ends separated from each other by a space, wherein the second antenna element is located in the space between the two label ends.

In another detailed aspect the wireless identification tag comprises an RFID tag and the identification signal comprises a serial number of the RFID tag that has been associated with the identification of the contents of the medical container.

In method aspects of the subject invention, a method for identifying a medical container is provided, the container having a size selected to hold a medical item and having an opening at one end at which is mounted a metallic closure, the method comprises mounting a wireless identification tag comprising a first antenna element and a tag circuitry element to the container, the tag circuitry element including a memory and a processor, the tag circuitry element being connected to the antenna element, the tag circuitry element configured to receive an interrogation signal through the antenna element and to transmit a response identification signal to the interrogation signal through the antenna element, wherein the response identification signal is associated with a medical item held by the medical container to identify the held item, and mounting the first antenna element of the identification tag into electrical connection with the metallic closure of the container thereby increasing the effective surface area of the antenna with the metallic closure.

In more detailed method aspects, the method further comprises sealing the opening of the medical container with an electrically resistant seal located between the metallic closure and the item contained by the medical container whereby the seal provides electrical insulation to the medical item held by the medical container from the electrically conductive metal closure. The method additionally comprises locating a dielectric element between the first antenna element and the metallic closure with the antenna element contacting the dielectric element on one side of the dielectric element and the metallic closure of the medical container contacting the dielectric element on an opposite side of the dielectric element from the antenna element, whereby the antenna element is capacitively coupled to the metallic container closure.

In further aspects, the step of locating a dielectric element comprises attaching the dielectric element to the first antenna element and the metallic closure with dielectric adhesive whereby the antenna element is capacitively coupled to the metallic container closure. The method further comprises locating a second antenna element that is also connected to the circuitry element through which an interrogation signal is received and an identification response signal is transmitted, along a side of the medical container at a position that does not mask any visually-readable labeling of the container. The step of locating a second antenna element comprises locating the second antenna element in a space between two ends of a label mounted around the container, wherein the label has visually readable information concerning the contents of the container that is not masked by the location of the second antenna element in the space between the two ends.

A further aspect is directed to a method for manufacturing a medical container to have an integral wireless identification system, the container having a size selected to hold a medical item and having an opening at one end, the method comprising filling the container with a desired medical item, stopping the opening of the medical container with a sealing material, crimping a metallic closure over the opening of the container and the sealing material to hold the sealing material in place over the opening to seal the opening, the metallic closure having an opening of a size selected to be large enough through which to insert a cannula through that opening and the stopper to access the item contained within the medical container, mounting a wireless identification tag comprising a first antenna element and a tag circuitry element to the container, the tag circuitry element including a memory and a processor, the tag circuitry element being connected to the antenna element, the tag circuitry element configured to receive an interrogation signal through the antenna element and to transmit a response identification signal to the interrogation signal through the antenna element, wherein the response identification signal is associated with a medical item held by the medical container to identify the held item, such that the first antenna element of the identification tag is mounted in electrical connection with the metallic closure of the container thereby increasing the effective surface area of the antenna with the metallic closure, and applying a label to the container over the wireless identification tag such that any visually readable information on the label can be read.

DETAILED DESCRIPTION OF THE PREFERRED EMBODIMENTS

Referring again to FIG. 1, there is shown a small sealed glass container 30 with a metallic crimp closure 32 fastened to the vial portion 34. Although not visible in the drawing, the crimp closure presses a rubber stopper into contact with the top of the vial to seal it shut. The drawing also shows FDA-mandated labeling 36 that almost surrounds the side of the vial 34 but between the two ends 40 and 42 of the label base material 35, there is a space 44 of the vial that is not covered with anything. The container is presently readable only by scanning the bar code 48 at the bottom 52 of the vial with a barcode reader. It would satisfy a need identified above if the container could be fitted with a wireless identification system readable by RF or other non-optical frequency. FIG. 3 shows one way to accomplish this; i.e., the "flag tag" system, but the drawbacks are significant, as discussed above.

Many ADCs and other medical item storage units are used to store medical vials and include RFID systems that establish energy fields within the drawer or storage space of the unit to detect and read RFID tags on items stored there. As with the other stored items that are larger, it is desirable to be able to automatically detect and identify small items in these storage units. Small medical item containers do not provide enough space on themselves to mount a standard RFID device due to the frequencies used. RFID frequencies that are used can require a larger surface area for an antenna than what may fit on the side of a small vial. While the use of a "flag tag" allows the use of the larger antenna in the RFID device, it would be more efficient if the tag were integral with the small container.

In storage drawers of ADCs for example, an RFID field of energy is established to interrogate the RFID tags on items stored there. It has been found that the interrogation energy bounces around in the storage area and that generally, any metal, such as that found in the metallic crimp closures of medical vials, can diminish the performance of RFID devices nearby by de-tuning them. That metal is a reflector of the RFID energy in the EM energy field. In accordance with aspects of the present invention, that energy is captured and used to run the RFID device and its communications.

Figure 4:
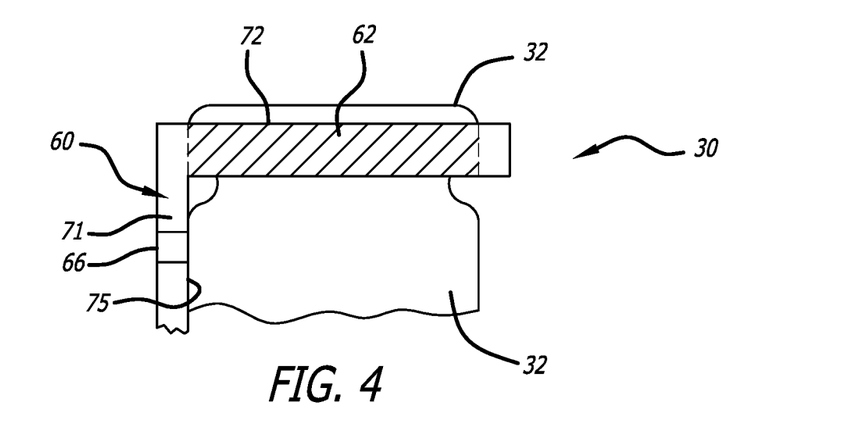
FIG. 4 is an enlarged view of a crimp closure top of a vial surrounded in this embodiment by an upper portion of an RFID antenna element and dielectric and showing the antenna element also mounted along the side of the vial.

Turning now to FIG. 4, a side schematic view of an RFID antenna element 60 capacitively coupled with the metallic crimp closure 32 of a sealed vial 30 is shown. The antenna element 60 includes two electrically connected parts. The first is the segment 71 mounted along the side 75 of the vial that leads from the RFID circuitry element 66 to the metallic closure 32. The second segment 72 is in direct electrical contact with the first segment 71 at a right angle and is capacitively coupled to the crimp closure 32. The area of capacitively coupling is shown with diagonal lines 62. By being electrically coupled to the crimp closure, the RFID antenna element 60 effectively increases its surface area and is more efficiently operated. By virtue of the metallic crimp closure, the antenna element now has more energy with which to run the circuitry element 66 and is a more efficient antenna at the RFID frequencies used. In this embodiment, the segments 71 and 72 are separately labeled with drawing numerals but may in fact be formed of the same piece of metal. It will also be noted that the second segment 72 makes a "T" formation with the first segment 71 and that it fits almost entirely around the circumference of the metallic crimp closure 32.

Figure 5:
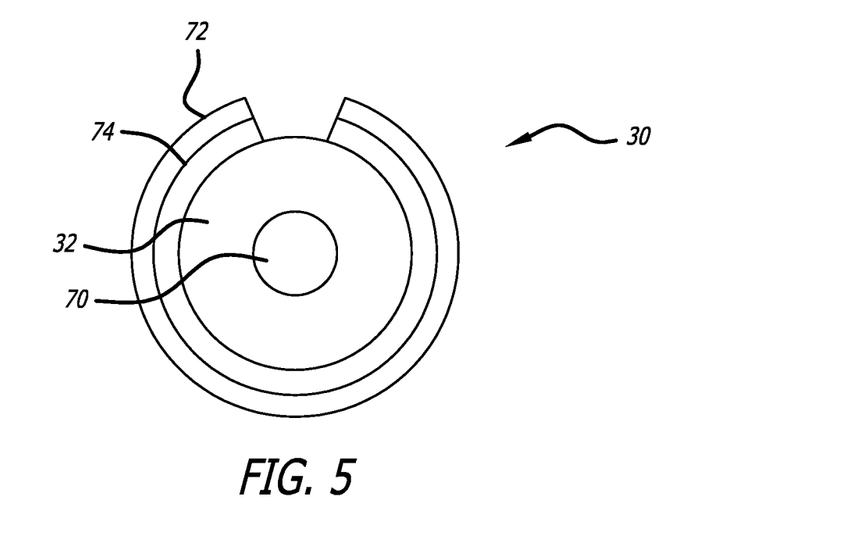
FIG. 5 is a top view of the crimp closure top of a very small vial showing the metallic crimp closure of the top having an antenna element of an RFID device with a dielectric located between the antenna element and the metallic crimp closure located around a substantial portion of the crimp closure.

FIG. 5 is a top view of the sealed vial 30 of FIG. 4 showing the sealed metallic crimp closure 32 having an open area 70 through which a sharpened cannula may be inserted to access the contents of the vial. The figure also shows the RFID antenna segment 72 capacitively coupled with the metallic crimp 32. A dielectric material 74 is positioned between the antenna element 72 and the metallic crimp 32 to capacitively couple the two together thereby enhancing the usefulness of the antenna 72 of the RFID device by increasing its surface area to include the metallic crimp closure. In this embodiment, the dielectric takes the form of an adhesive tape that also bonds the antenna element 72 to the crimp closure 32. One dielectric tape found useful for this purpose is the 3M 467MP product that contains adhesive 200MP, available from the 3M Company, Industrial Adhesives and Tapes Division, 3M Center, Building 225-3S-06, St. Paul, Minn. 55144-1100, 1-800-223-7427.

Enhancing the surface area of the RFID antenna element 72 by capacitively coupling it to the metallic closure 32 results in a greater ability to interrogate the RFID element on the medication container 30 and will result in less interference between containers in the same spatial storage area. Instead of the metallic crimp closure simply reflecting electromagnetic ("EM") energy in the storage drawer or other unit it is placed in and de-tuning RFID device near it, it is used in accordance with the invention to conduct that EM energy to the RFID device for its enhanced operation.

Figure 6:
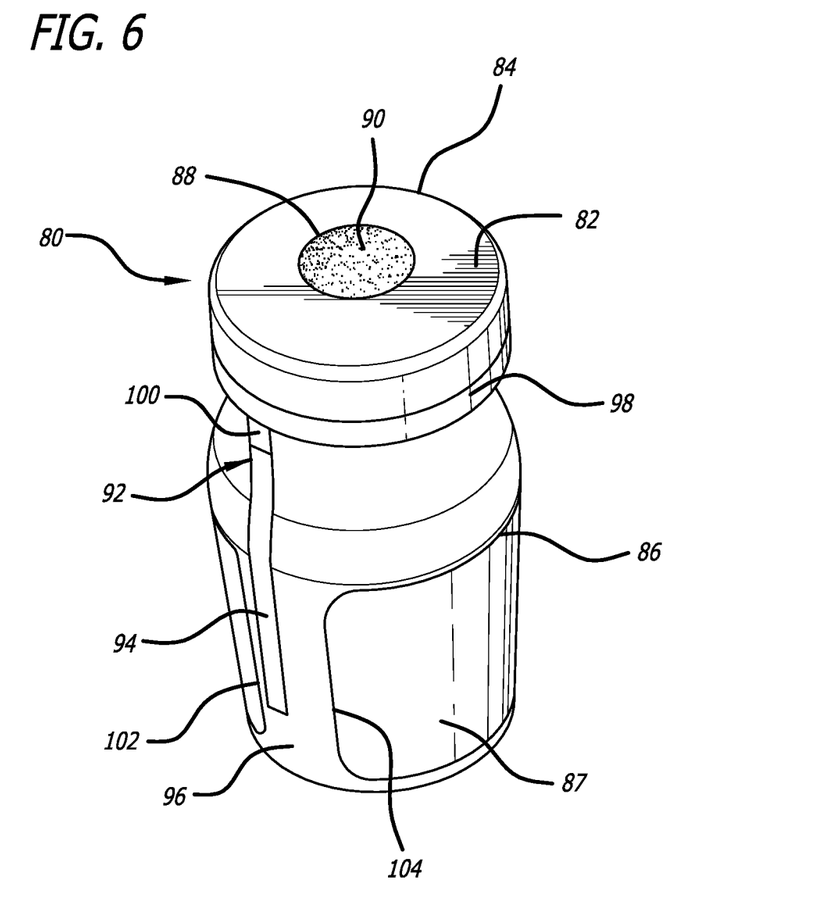
FIG. 6 is a perspective view of an embodiment of mounting an RFID identification device to a very small glass medical container in accordance with aspects of the invention, in which a first element of a dipole antenna is located and capacitively coupled to the metallic crimp closure top, and the RFID circuitry element and a second dipole antenna element are located along the side of the vial between the ends of the information label.

FIG. 6 is a perspective view of a sealed vial 80 having a metallic crimp closure 82 that seals the vial. As in FIG. 5, an opening 88 in the crimp closure 82 permits a sharpened cannula (not shown) to be inserted through the rubber seal 90 of the crimp closure to access the interior of the vial. Also shown in FIG. 6 is an RFID device 92 having a first antenna element 98 that is positioned over a portion of the metallic crimp closure 82 and is capacitively coupled thereto to increase the effectiveness of the first antenna element 98 and indeed the entire antenna of the RFID device 92. The first antenna element 98 is connected to the RFID circuitry element 100, which is connected at its opposite end to a second antenna element 94. The second antenna element is located along the side 96 of the medical item container in the open area where no labeling 87 exists. Because the label 87 in the embodiment shown in FIG. 6 is smaller and its ends 102 and 104 do not touch when it is mounted to the vial, the PDP is not shown.

Figure 7:
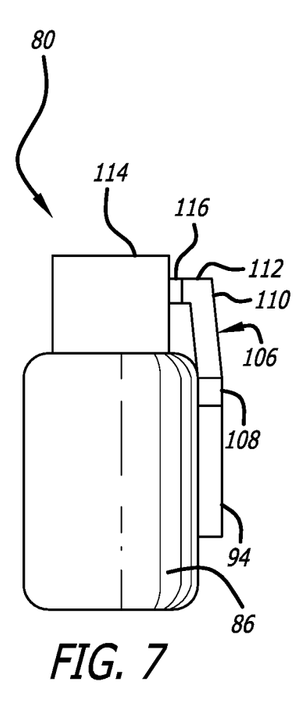
FIG. 7 is a side view of a small medical item container having an RFID device attached thereto showing a first antenna element attached with a dielectric adhesive to the metallic crimp cap, and the RFID circuitry and a second antenna element attached to the side of the container.
Figure 8:
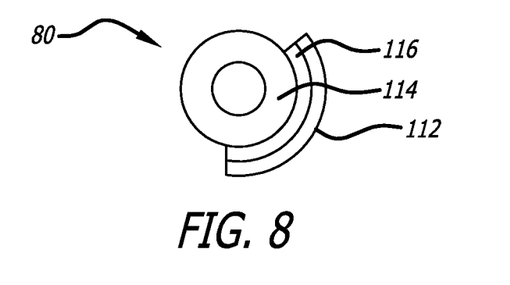
FIG. 8 is a top view of the container of FIG. 7 showing the first antenna element attached by dielectric adhesive to the crimp closure.

FIG. 7 presents a different embodiment of an RFID system in accordance with aspects of the invention, wherein a first antenna element 106 has a first portion 110 traversing the space between the RFID circuitry element 108 and the metallic crimp closure 114 and then is attached to the closure with a dielectric tape 116. The RFID system includes a second antenna element 94 attached to the RFID circuitry and extending in the opposite direction from the first antenna element along the side 86 thus providing an antenna having two poles for the RFID circuitry element 108. In the case of the second antenna element 94, it is firmly attached to the side 86 of the vial 80 by adhesive or other means known to those skilled in the art. FIG. 8 shows the same RFID system from a top view of the medical item container 80. The metallic crimp closure 114 of the container 80 is shown with the first antenna element 112 and a coupling dielectric portion 114 positioned in electrical connection with it.

Figures 9, 10:
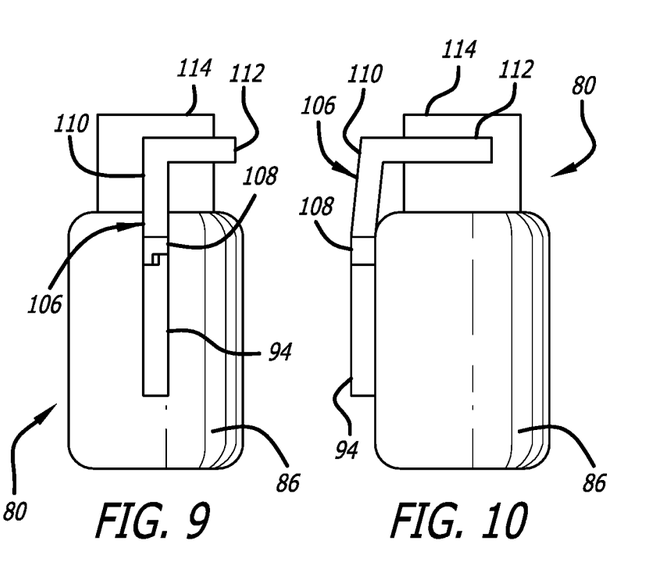
FIG. 9 is a front view of the container of FIGS. 7 and 8 showing the antenna elements and the RFID circuitry attached to the crimp closure and the side of the container.
FIG. 10 shows the opposite side view of that of FIG. 7 showing the first antenna element located around the metallic crimp closure of the container with the RFID circuitry and second antenna element located along the side of the container.

FIG. 9 is a side view of the system of FIGS. 7 and 8 showing the RFID circuitry element 108 having a dipole antenna with a first element 106 extending to the metallic crimp closure 114 and making electrical contact with it to increase the surface area of the first antenna element. A dielectric (not shown) is positioned between the first antenna element and the metallic crimp closure as shown in FIGS. 7 and 8. FIG. 10 also presents a side view of the wireless identification system of FIGS. 7-9 but is the opposite side from that shown in FIG. 7. The first antenna element 106 is seen extending from the RFID circuitry element 108, to the metallic crimp closure 114 and then extending at a ninety degree angle to be located around the crimp closure as shown more clearly in FIG. 8.

Figure 11:
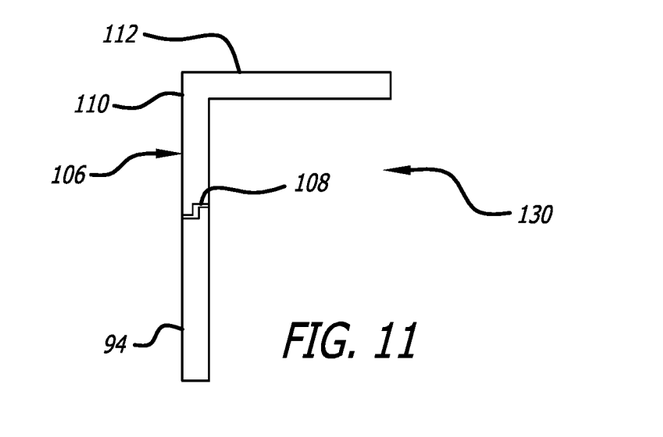
FIG. 11 shows an embodiment of an RFID device in accordance with aspects of the invention usable for mounting to very small containers of medical items.

FIG. 11 is a view of the RFID system 130 shown in FIGS. 7-10 with the first antenna element 106 with its two segments 110 and 112. The first portion 110 proceeding from the RFID circuitry element 108 and the second portion 112 located at ninety degrees from the first portion forming an "L" shape in this embodiment. The second antenna element 94 also connected with the RFID circuitry element 108.

The RFID system in FIGS. 7-10 is shown in exaggerated form so that the various components and connections can be more clearly seen. The antenna elements 106 and 94, and the RFID circuitry element 108 are likely to be much thinner than shown. Additionally, the manner of using adhesives to attach the RFID system to the container 80 results in an integrated nature of the RFID system 130 with the vial 80. Such an arrangement can be implemented during the manufacturing process to result in a useful and convenient wireless, non-optical identification system and method.

Figure 12:
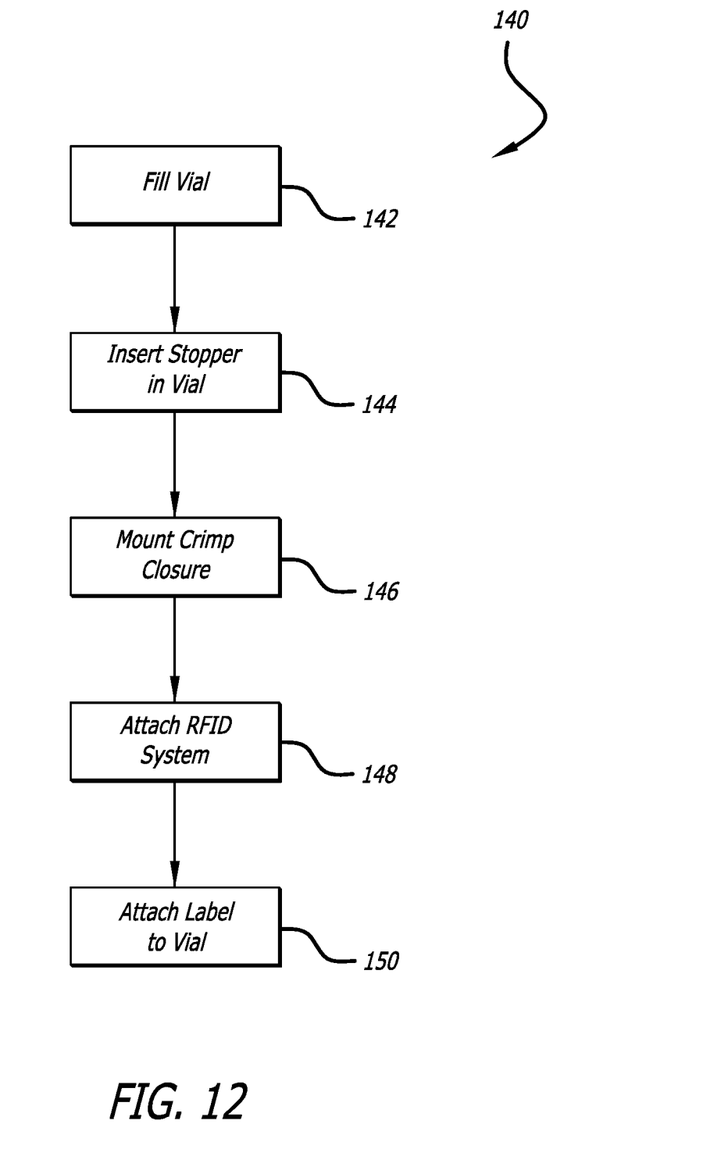
FIG. 12 is a block flow diagram of a manufacturing method in accordance with aspects of the invention.

In particular referring now to FIG. 12, in such a manufacturing process or method 140, the container may be filled 142 with the medical item designated for the container, the stopper 144 and metallic crimp closure 146 may be attached to seal the container, the RFID system may be then mounted 148 to the metallic crimp closure and the side of the container, and then the label may be attached 150 to the container over the RFID circuitry element and the second antenna element as needed. If the label is smaller than the circumference of the container such that there would be an open space between its two ends, the label may be mounted to the container such that the space between the two ends is located at the position of the RFID system. The above steps of the manufacturing process may by implemented in different orders as needed.

Figure 13:
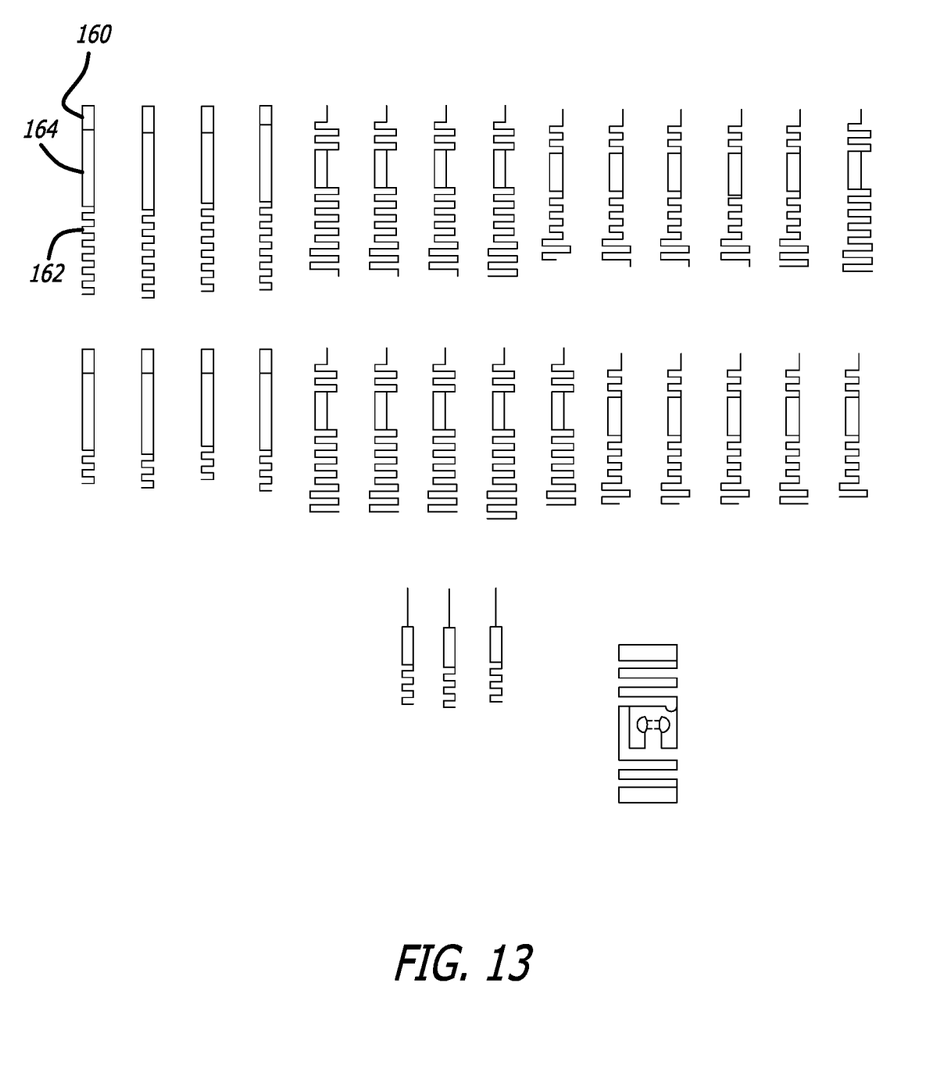
FIG. 13 presents different embodiments of RFID antennas usable with RFID circuitry elements on medical item containers.

FIG. 13 is a diagram of various antenna element arrangements usable in the RFID systems shown in other figures. Each of the antennas shown includes a first antenna element 160 and a second antenna element 162 with an RFID circuitry element 164 located in between. The numerals are shown on only one of the alternate antenna configurations in FIG. 13 to preserve clarity in the figure. In the case of the RFID system shown with numerals in FIG. 13, the first antenna element is smaller than the second antenna element because it will be dielectrically coupled to the electrically conductive crimp closure and the closure will provide the necessary surface area for that pole of the antenna.

There has thus been provided a system and method to mount an RFID device to vials, including very small medication vials with very little unlabeled space left on the vial. The novel system and method of the invention do not cover any labeling of the vial, and do not require the use of a protruding flag RFID system. The RFID system and method in accordance with the invention do not significantly protrude from the vial whatsoever and yet provide the means to automatically detect and track the vial regardless of what orientation it may have in relation to a reader antenna. Additionally, since the metallic crimp closure forms a part of the RFID system, adjacent metallic crimp closures of other vials will not interfere with tracking each vial. This increased electrical performance of the RFID system permits the containers to be placed in different orientations within drawers or other storage units and still be detected and identified. Thus there has been provided a new and useful system and method that provides improved performance for RFID systems attached to medication containers having metallic crimp closures, and is especially useful for smaller containers. Required labeling is still readable and not masked by the new RFID system, yet the containers may be detected and identified.

In the above detailed description, well-known devices, methods, procedures, and individual components have not been described in detail so as not to obscure aspects of the present invention. Those skilled in the art will understand those devices, methods, procedures, and individual components without further details being provided here. Moreover, while the embodiments disclosed above are described for use in a healthcare facility environment, it will be understood that the system and method may be useful in other environments as well, such as outpatient clinics, doctors' offices, and other environments.

Further features and/or variations of the invention may be provided in addition to those set forth herein. For example, the present invention may be directed to various combinations and sub-combinations of the disclosed features and/or combinations and sub-combinations of several further features disclosed below in the detailed description.

While the invention has been described in connection with what are presently considered to be the most practical and preferred embodiments, it is to be understood that the invention is not to be limited to the disclosed embodiments and elements, but, to the contrary, is intended to cover various modifications, combinations of features, equivalent arrangements, and equivalent elements included within the spirit and scope of the appended claims. The invention may be embodied in other forms without departure from the spirit, scope, and essential characteristics thereof. The embodiments described therefore are to be considered in all respects as illustrative and not restrictive. Although the present invention has been described in terms of certain preferred embodiments and applications, other embodiments and applications that are apparent to those of ordinary skill in the art are also within the scope of the invention.

What is claimed is:

1. A system for identifying a medical container, the container having an outer surface, a size selected to hold a medical item, a label having text, and an opening at one end, the system comprising:
    an electrically conductive cap located at the opening of the container, the cap having an inner surface and an outer surface;
    a wireless identification tag comprising a first antenna element electrically connected to a tag circuitry element, the tag circuitry element including a memory and a processor with the tag circuitry element processor being programmed to receive an interrogation signal through the first antenna element, to access the tag circuitry memory to retrieve a tag identification number, and to transmit the retrieved tag identification number in an identification signal in response to the interrogation signal through the first antenna element, wherein the response identification number is associated with a medical item held by the medical container to identify the held item, wherein the wireless identification tag is located on the outer surface of the container at a location that does not obscure the label text from being read;
    wherein the first antenna element is electrically connected to the outer surface of the cap of the container thereby increasing the effective surface area of the antenna with the cap.

2. The system for identifying a medical container of claim 1 further comprising an electrically resistant seal located between the inner surface of the electrically conductive cap and the opening of the container, whereby the seal prevents the medical item from escaping from the container and provides electrical insulation between the electrically conductive cap and the medical item located within the medical container.

3. The system for identifying a medical container of claim 1 further comprising a dielectric element located between the first antenna element and the electrically conductive cap with the antenna element contacting the dielectric element on one side of the dielectric element and the electrically conductive cap of the medical container contacting the dielectric element on an opposite side of the dielectric element from the antenna element, whereby the antenna element is capacitively coupled to the electrically conductive cap.

4. The system for identifying a medical container of claim 3 wherein the dielectric element comprises adhesive located on either side of the dielectric element whereby the first antenna element is held by adhesive to one side of the dielectric element and the electronically conductive cap is held by adhesive to an opposite side of the dielectric element from the antenna element, whereby the antenna element is capacitively coupled to the electrically conductive cap.

5. The system for identifying a medical container of claim 1 further comprising a second antenna element also connected to the circuitry element through which an interrogation signal is received and an identification response signal is transmitted, wherein the second antenna element is located along a side of the medical container at a position that does not mask any visually-readable labeling of the container.

6. The system for identifying a medical container of claim 5 wherein the medical container includes a label located around the container, the label having visually readable information concerning the contents of the container and also having two ends separated from each other by a space; wherein the second antenna element is located in the space between the two label ends.

7. The system for identifying a medical container of claim 1 wherein the first antenna element is directly electrically connected to the electrically conductive cap;
    the system further comprising an electrically resistant seal located between the electrically conductive cap and the item contained by the medical container whereby the seal provides electrical insulation to the medical item held by the medical container from the electrically conductive cap.

8. The system for identifying a medical container of claim 7 further comprising a second antenna element also connected to the circuitry element through which an interrogation signal is received and an identification response signal is transmitted, wherein the second antenna element is located along a side of the medical container at a position that does not mask any visually-readable labeling of the container.

9. The system for identifying a medical container of claim 8 wherein the medical container includes a label located around the container, the label having visually readable information concerning the contents of the container and also having two ends separated from each other by a space;

wherein the second antenna element is located in the space between the two label ends.

10. The system for identifying a medical container of claim 9 wherein the wireless identification tag comprises an RFID tag.

11. The system for identifying a medical container of claim 10 wherein the identification signal comprises a serial number of the RFID tag that has been associated with the identification of the contents of the medical container.

12. An identification system for a medical item container, the container having a size selected to hold a medical item and having an outer surface, an opening at one end on which is mounted an electrically conductive cap, the container further having a side of the outer surface on which a label having visually readable information concerning the held item is mounted, the label having ends which, when the label is mounted to the container, are separated from each other by a space, the identification system comprising:
an RFID tag located at the outer surface of the container, the RFID tag comprising a first antenna element, a second antenna element, and a tag circuitry element, the tag circuitry element including a memory and a processor, the tag circuitry element being connected to the first and second antenna elements, both of which are also located at the outer surface of the container, the tag circuitry element configured to receive an interrogation signal through the first and second antenna elements and to transmit a response identification signal to the interrogation signal through the first and second antenna elements, wherein the response identification signal is associated with a medical item held by the medical container to identify the held item;
wherein the first antenna element is electrically connected to the electrically conductive cap of the container thereby increasing the effective surface area of the antenna with the cap; and
wherein the second antenna element is mounted to the outer surface of the container and extending along the side of the container between the ends of the labeling mounted on the container, such that the second antenna element does not mask any visually readable information of the labeling.

13. The identification system of claim 12 further comprising a dielectric element located between the first antenna element and the electrically conductive cap with the antenna element contacting the dielectric element on one side of the dielectric element and the electrically conductive cap of the medical container contacting the dielectric element on an opposite side of the dielectric element from the antenna element, whereby the antenna element is capacitively coupled to the electrically conductive cap.

14. The identification system of claim 13 wherein the dielectric element comprises adhesive located on either side of the dielectric element whereby the first antenna element is held by adhesive to one side of the dielectric element and the electrically conductive cap is held by adhesive to an opposite side of the dielectric element from the antenna element, whereby the antenna element is capacitively coupled to the electrically conductive cap.

15. The identification system of claim 12 wherein the first antenna element is directly electrically connected to the electrically conductive cap;
the system further comprising an electrically resistant seal located between the electrically conductive cap and the item contained by the medical container whereby the seal provides electrical insulation to the medical item held by the medical container from the electrically conductive cap.

16. The identification system of claim 12 wherein the identification signal comprises a serial number of the RFID tag that has been associated with the identification of the contents of the medical container.

17. A method for identifying a medical container, the container having an outer surface, a size selected to hold a medical item, and having an opening at one end at which is mounted an electrically conductive cap, the method comprising:
mounting a wireless identification tag comprising a first antenna element and a tag circuitry element to the outer surface of the container, the tag circuitry element including a memory and a processor, the tag circuitry element being connected to the antenna element, the tag circuitry element configured to receive an interrogation signal through the antenna element and to transmit a response identification signal to the interrogation signal through the antenna element, wherein the response identification signal is associated with a medical item held by the medical container to identify the held item; and
mounting the first antenna element of the identification tag into electrical connection with the electrically conductive cap of the container thereby increasing the effective surface area of the antenna with the electrically conductive cap.

18. The method for identifying a medical container of claim 17 further comprising sealing the opening of the medical container with an electrically resistant seal located between the electrically conductive cap and the item contained by the medical container whereby the seal provides electrical insulation to the medical item held by the medical container from the electrically conductive cap.

19. The method for identifying a medical container of claim 17 further comprising locating a dielectric element between the first antenna element and the electrically conductive cap with the antenna element contacting the dielectric element on one side of the dielectric element and the electrically conductive cap of the medical container contacting the dielectric element on an opposite side of the dielectric element from the antenna element, whereby the antenna element is capacitively coupled to the electrically conductive cap.

20. The method for identifying a medical container of claim 19 wherein the step of locating a dielectric element comprises attaching the dielectric element to the first antenna element and the electrically conductive cap with dielectric adhesive whereby the antenna element is capacitively coupled to the electrically conductive cap.

21. The system for identifying a medical container of claim 1 wherein the cap of the container includes a cap opening with a cap opening seal in the cap opening that are configured to permit the insertion of a sharpened cannula through the cap opening and the cap opening seal to access contents of the container; and
wherein the first antenna element is electrically connected to the outer surface of the cap of the container at a location that does not block either the cap opening of the cap opening seal.

22. The system for identifying a medical container of claim 12 wherein the cap of the container includes a cap opening with a cap opening seal in the cap opening that are configured to permit the insertion of a sharpened cannula through the cap opening and the cap opening seal to access contents of the container; and wherein the first antenna element is electrically connected to the outer surface of the cap of the container at a location that does not block either the cap opening or the cap opening seal.

23. The method for identifying a medical container of claim 17 wherein the cap of the container includes a cap opening with a cap opening seal in the cap opening that are configured to permit the insertion of a sharpened cannula through the cap opening and the cap opening seal to access contents of the container; and wherein the step of mounting the first antenna element of the identification tag into electrical connection with the electrically conductive cap further comprises mounting the first antenna element at a location that does not block either the cap opening or the cap opening seal.

* * * * *